US012482181B2

(12) United States Patent
Llamas Virgen et al.

(10) Patent No.: US 12,482,181 B2
(45) Date of Patent: Nov. 25, 2025

(54) GENERATING VIRTUAL AVATARS TO OPTIMIZE VIDEO DATA TRANSMISSION

(71) Applicant: International Business Machines Corporation, Armonk, NY (US)

(72) Inventors: Paul Llamas Virgen, Guadalajara (MX); Kasia Karimee Garcia Bracho, Guadalajara (MX); Luisa Alejandra Rizo Lameiras, Zapopan (MX); Jesus Gabriel Trillo Vargas, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 18/499,837

(22) Filed: Nov. 1, 2023

(65) Prior Publication Data

US 2025/0139884 A1   May 1, 2025

(51) Int. Cl.
*G06T 17/00*   (2006.01)
*G06T 3/60*   (2024.01)
*G06V 40/16*   (2022.01)
*G06V 40/20*   (2022.01)
*H04N 7/15*   (2006.01)

(52) U.S. Cl.
CPC .............. *G06T 17/00* (2013.01); *G06T 3/60* (2013.01); *G06V 40/174* (2022.01); *G06V 40/28* (2022.01); *H04N 7/157* (2013.01)

(58) Field of Classification Search
None
See application file for complete search history.

(56) References Cited

U.S. PATENT DOCUMENTS

| | | | |
|---|---|---|---|
| 7,583,287 B2 | 9/2009 | Cohen et al. | |
| 8,588,309 B2 | 11/2013 | Doepke | |
| 8,908,904 B2 | 12/2014 | Santos et al. | |
| 9,094,576 B1 * | 7/2015 | Karakotsios | G10L 15/02 |

(Continued)

FOREIGN PATENT DOCUMENTS

| | | |
|---|---|---|
| CA | 3023488 C | 6/2022 |
| CN | 104599284 A | 5/2015 |

(Continued)

OTHER PUBLICATIONS

Network Requirements for the Metaverse, Are We Ready?, iceConnect, Dated: Apr. 26, 2022, pp. 1-6.

*Primary Examiner* — Ryan M Gray
(74) *Attorney, Agent, or Firm* — Patterson + Sheridan, LLP (57) ABSTRACT

Embodiments of the present disclosure provide methods, systems, and computer program products for generating virtual avatars and optimizing video data transmission in a virtual reality environment. A disclosed non-limiting method implements virtual avatars detects physiognomic and body points of a user in a virtual reality system in order to create a digital twin for a virtual avatar of the user. The system determines a maximum available resolution at a given time for the physiognomic and body points; and determines, based on the maximum available resolution, an amount of information to send and receive between endpoints of a virtual reality system for rendering the digital twin of the user's virtual avatar at the given time. The system selects a number of the physiognomic and body points for rendering a virtual avatar at the given time based on the determining the amount of information.

20 Claims, 8 Drawing Sheets

(56) References Cited

U.S. PATENT DOCUMENTS

| | | |
|---|---|---|
| 9,747,493 B2 | 8/2017 | Rodriguez et al. |
| 10,424,101 B2 | 9/2019 | Castelli et al. |
| 10,958,874 B2 | 3/2021 | Astarabadi et al. |
| 2020/0162274 A1* | 5/2020 | Iyer ............... H04L 65/4015 |
| 2022/0101587 A1* | 3/2022 | Huang .................. G06T 13/40 |
| 2022/0368856 A1* | 11/2022 | Choi ...................... H04N 7/157 |
| 2023/0070050 A1 | 3/2023 | Zavesky et al. |
| 2023/0082513 A1 | 3/2023 | Rowley |

FOREIGN PATENT DOCUMENTS

| | | |
|---|---|---|
| CN | 103279987 B | 5/2016 |
| EP | 1922877 B1 | 5/2016 |
| JP | 6408629 B2 | 10/2018 |
| KR | 102424123 B1 | 7/2022 |

\* cited by examiner

GENERATING VIRTUAL AVATARS TO OPTIMIZE VIDEO DATA TRANSMISSION

BACKGROUND

The present invention relates to the data processing field, and more specifically, to methods, systems, and computer program products for generating virtual avatars of users to optimize video data transmission in a virtual reality environment.

Virtual reality (VR) is a completely immersive experience that replaces a real-life environment with a simulated or virtual environment. The metaverse is a virtual-reality space in which users can interact with a computer-generated environment and other users. Currently the metaverse is becoming an active field of interest, and virtual avatars can be the most important agents participating in user interactions and engagements. In an immersive metaverse experience, the video and audio data are transmitted over a digital network; typically, the network is a broadband Internet connection. An avatar is an electronic image that represents a particular person or computer user in various internet forums, video conferences, video games, and the like. Avatars can provide reality-based representations that attempt to mimic real-world people and include facial expression and body movements. Two major factors that influence effectiveness and quality of the users' immersive experience include an available upload and download network bandwidth, and local computing power of the users.

SUMMARY

Embodiments of the present disclosure are directed to methods, systems, and computer program products for generating virtual avatars and optimizing video data transmission in a virtual reality environment to enhance immersive metaverse experience of users.

A disclosed non-limiting computer implemented method comprises detecting physiognomic and body points of a user in a virtual reality system in order to create a digital twin for a virtual avatar of the user. The system determines a maximum available resolution at a given time for the physiognomic and body points; and determines, based on the maximum available resolution, an amount of information to send and receive between endpoints of a virtual reality system for rendering the digital twin of the user's virtual avatar at the given time. The system selects a number of the physiognomic and body points for rendering a virtual avatar at the given time based on the determining the amount of information.

Other disclosed embodiments include a computer system and computer program product for generating virtual avatars in a virtual reality system optimizing video data transmission, implementing features of the above-disclosed methods.

DETAILED DESCRIPTION

Disclosed embodiments provide systems and methods for generating virtual avatars, enhancing immersive metaverse experience of a user by optimizing video data transmission in a virtual reality environment. Disclosed embodiments provide new techniques to generate virtual avatars and optimize video data transmission by detecting physiognomic and body points or characteristics of the user in order to create a digital twin for a virtual avatar of the user. In a disclosed embodiment, the physiognomic and body points or characteristics of the user represent micro and macro body expressions, for example, anger, fear, disgust, sadness, happiness, surprise and contempt. In a disclosed embodiment, the physiognomic and body characteristics are analyzed and reconstructed, determining specific micro or macro body expressions through defined points of interest, or cardinal points, and selectively increasing or decreasing the cardinal points to transmit for rendering the virtual avatar based on user's hardware or computing power and network conditions at a given time.

Disclosed embodiments provide the ability to compute physiognomic expressions by cardinal points as well as computing an optimal amount of cardinal points to be transmitted end-to-end to avoid degraded data transmission. In one embodiment, the number of cardinal points sent on the system in real time is modified based on a set of factors (e.g., at least one or more of users' computing power, bandwidth, internet speed or quality) to enhance the users immersive metaverse experience while maintaining video quality. Disclosed embodiments thod track multiple body and face points to render a virtual avatar-representation based on one or a combination of factors, such as computing power and internet speed or bandwidth. The embodiments herein provide algorithms or equations to compute specific micro or macro body expressions, or physiognomic and body characteristics, to be rendered based on the users' computing power.

Disclosed embodiments analyze and update dynamically virtual body models for video conferences, which includes optimizing end-to-end rendering by sending identified cardinal points depending on a user's available hardware and customized settings to generated 3D model or digital twin associated with the cardinal points for participants in the immersive environment. In one embodiment, the cardinal points are transformed into virtual avatars, or 3D objects, and enhance a user's experience by dynamically optimizing the rendering of the virtual avatar, depending on user's computing power, internet speed, bandwidth, and the like. In one embodiment, cardinal vectors' dynamic adaption is based on current network status. Disclosed embodiments enable cardinal vectors' dynamic adaption based on current endpoint computing power of the users or video conference attendees. A disclosed system and method enable 3D endpoint rendering based on physiognomic computation of optimal rendering points, and expressions scale mapping and smooth transitions based on an endpoint's computing power and transmission resources. Disclosed embodiments provide the ability to optimize rendering of a user's virtual avatar, for example using a number of physiognomic and body points for available user expressions to increase realism without sacrificing the user's experience due to a transmission bottleneck.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
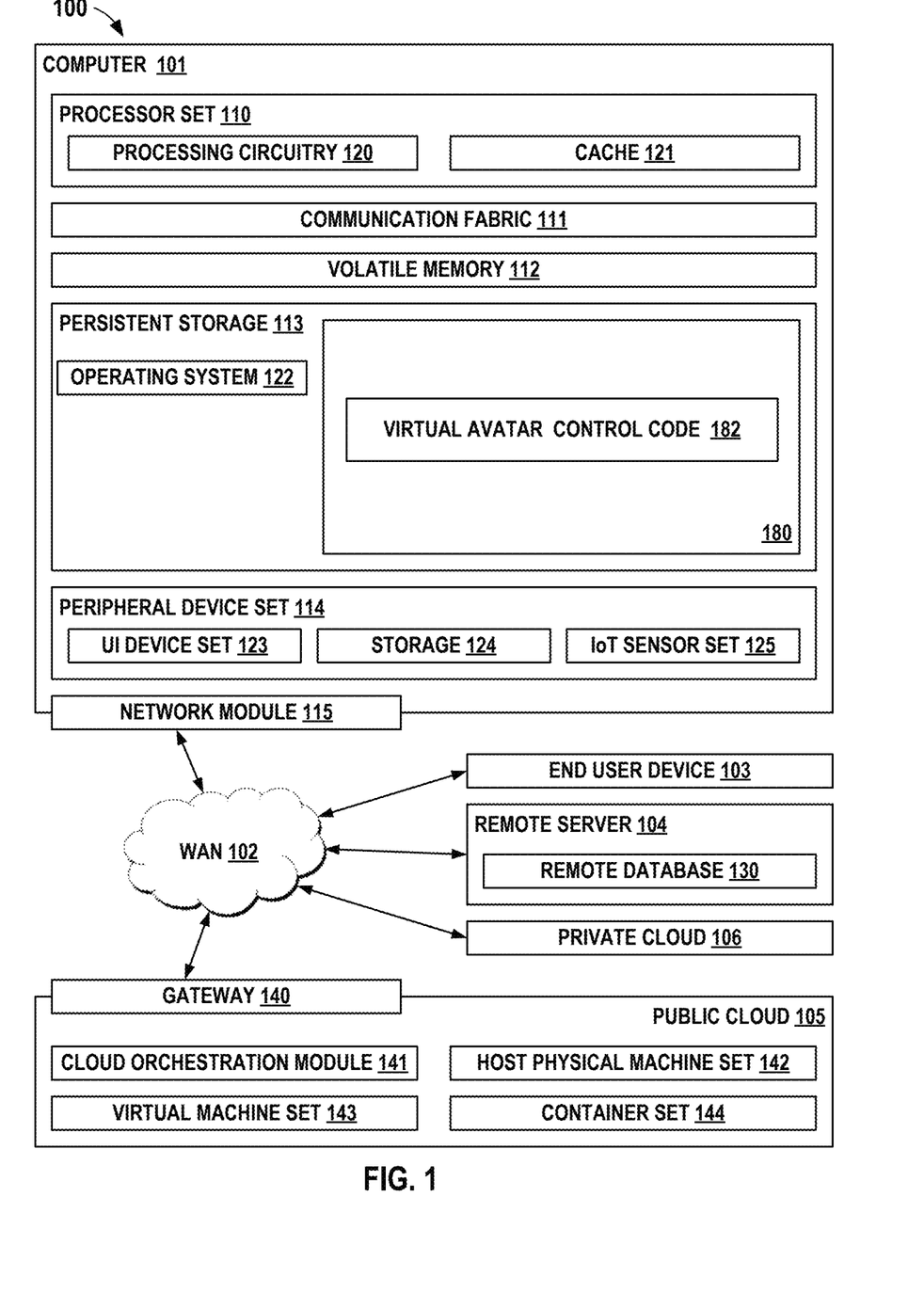
FIG. 1 is a block diagram of an example computer environment for use in conjunction with one or more disclosed embodiments for dynamically generating virtual avatars to optimize video data transmission.

Referring to FIG. 1, a computing environment 100 contains an example of an environment for the execution of at least some of the computer code involved in performing the inventive methods, such as Virtual Avatar Control Code 182, at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In accordance with disclosed embodiments, enhanced metaverse experience is enabled based on new techniques to generate virtual avatars and optimize video data transmission. A disclosed VR system records multiple physiognomic and body points of interest (e.g., cardinal points) of the user's face and body to correlate these points in future face expressions, in order to recreate a digital twin or 3D model for the virtual avatar. A disclosed VR system saves the digital twin or 3D model for the virtual avatar and exposed to conference service to use for a video conference or other virtual meeting and when a conference starts, the user's device has the counterpart face models of other attendees. In a disclosed embodiment, optimizing video data transmission includes reconstructing digital twin models based on detecting, analyzing and reconstructing cardinal points representing physiognomic and body characteristics, which are used for dynamically rendering a digital twin model of the virtual avatar. Each end user of VR meetings have a device that start detecting the face cardinal points and transmit data to counterpart attendees to recreate the digital twin models based on current available data stream capability and face rebuilding complexity based on local device computing power. The end users of VR meetings achieve enhanced immersive experiences, where virtual avatars of the users include facial expressions and body actions provided through the rendered avatars of disclosed embodiments. When members of a video meeting experience low network bandwidth or lower computing capabilities a given time, the disclosed VR system sends a video data stream to render the digital twin model with a lower amount of information at the given time. For example, the disclosed VR system transmits video data with dynamic adaptation of cardinal point vectors representing the physiognomic and body characteristics or cardinal points of interest including eyes, mouth, eyebrow, face contour, and body points.

In accordance with disclosed embodiments, the disclosed VR system determines and registers a maximum available resolution at a specific time based on external factors that influence in the users' immersive experience, such as the user computing power and platform used, and available network bandwidth. Once the maximum available resolution is set, the disclosed VR system then determines an amount of information available to send and/or to receive based on the set maximum available resolution. The disclosed VR system selects, based on the identified amount of information, a number of the physiognomic and body points for rendering the virtual avatar at the given time. The disclosed VR system provides an enhanced user immersive experience based on dynamically adapting physiognomic and body points to recreate the digital twin of the virtual avatar, based on the available processing power and performance capabilities of the end user rendering devices. In accordance with disclosed embodiments, the disclosed VR system optimize end-to-end rendering by sending a selected number of cardinal points. In accordance with disclosed embodiments, the disclosed VR system performs cardinal vectors' dynamic adaption based on at least one of current network status, or current endpoint computing power (e.g., user's available graphics processing hardware and customized settings).

Figure 2:
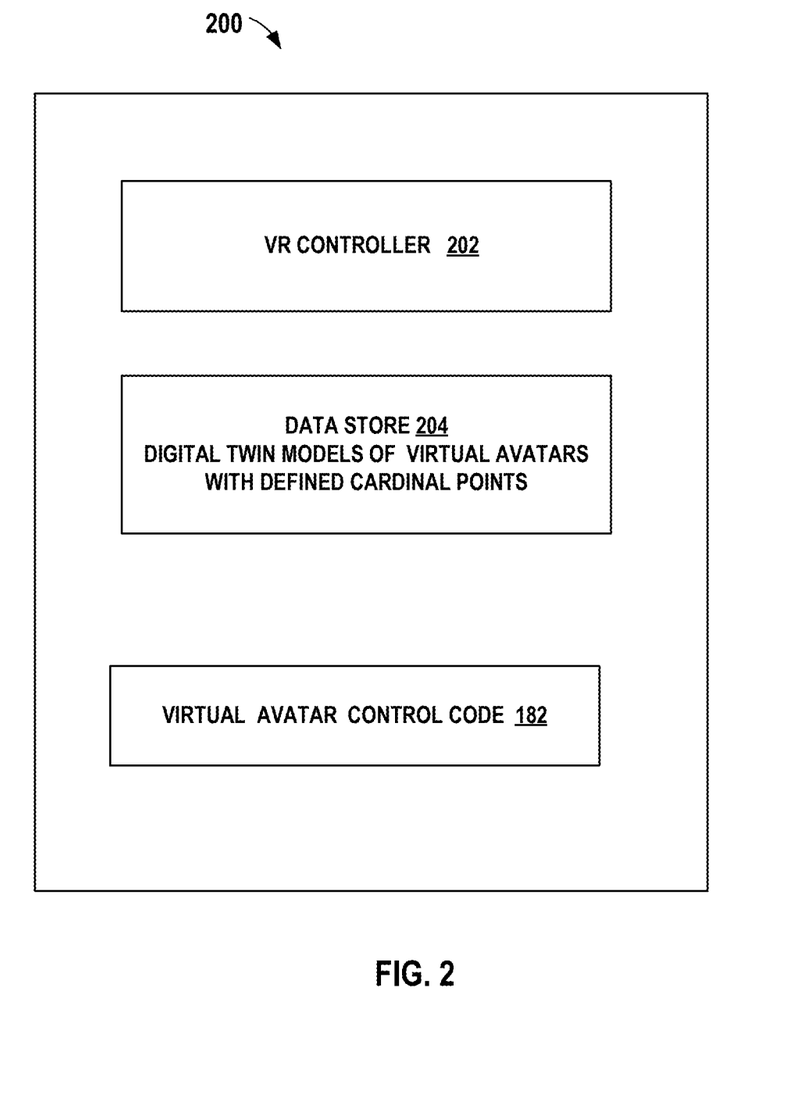
FIG. 2 is a block diagram of an example virtual reality (VR) system for dynamically generating virtual avatars to optimize video data transmission of one or more disclosed embodiments.

FIG. 2 illustrates an example VR system 200 for dynamically generating virtual avatars to optimize video data transmission and provide an enhanced user immersive experience of one or more disclosed embodiments. System 200 can be used in conjunction with computer 101 and cloud environment of the computing environment 100 of FIG. 1 for implementing virtual avatars, optimizing video data transmission in a virtual reality environment and enhancing user immersive metaverse experience. In one embodiment, system 200 perform a series of steps of new methods for smart data transfer, to optimize transferring video data to render digital twin virtual avatars and heighten the immersive experience of the users.

VR system 200 includes a VR Controller 202 and Virtual Avatar Control Code 182 which can be used together with processor computer 101 of the computing environment 100 of FIG. 1 for generating and rendering virtual avatars in real time of disclosed embodiments. System 200 includes a data store 204 that stores digital twin models of virtual avatars including key physiognomic and body points or cardinal points used for rendering a virtual avatar for video conferences or calls. System 200 obtains an image of the real world attendees of a video conference and provides a metaverse digital image generated as a digital twin for rendering a virtual avatar to a user's virtual reality device, such as a computer, a VR headset, or the like.

In an embodiment, the VR system 200 identifies and registers a determined maximum available resolution at specific time instance for the video conference attendees or endpoint users. Once the VR system 200 sets a maximum available resolution for the given time, the VR system then determines an amount of information available to send and/or to receive as a function of a plurality of external factors which impact in the users' immersive experience. For example, the VR system 200 may determine the amount of information based on one or more of a user's computer power, computer platform, network bandwidth to receive and transmit data, and the like. In a disclosed embodiment, the VR system 200 selects a number of physiognomic and body points, or cardinal points, to transmit to counterpart users of the video conference based on disclosed methods to update dynamically digital twin models of virtual avatars and enable enhanced quality of the users' immersive experience. The VR system 200 selects a number of cardinal points based on disclosed methods to analyze overall computing platform and performance capabilities of the users' rendering devices.

Figure 3:
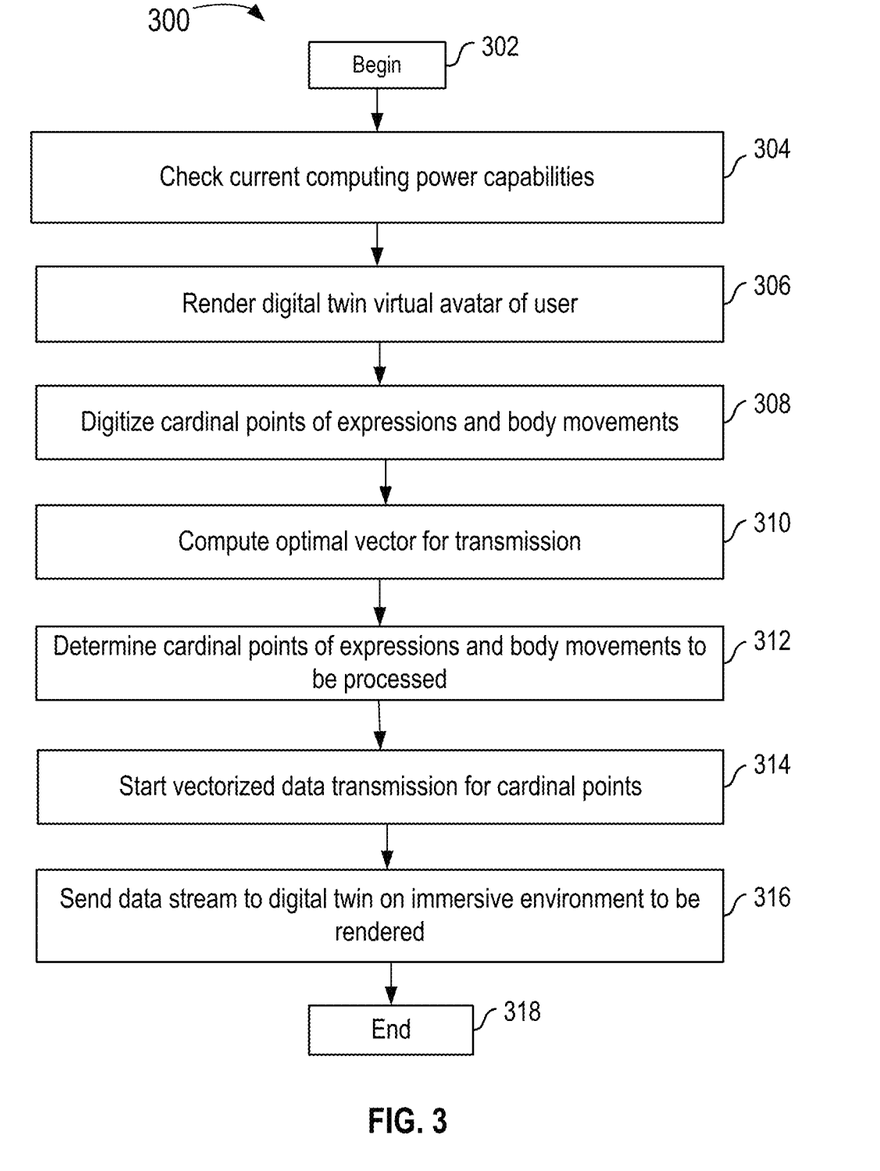
FIG. 3 is a flow chart illustrating example operations of a method for dynamically generating virtual avatars to optimize video data transmission of one or more disclosed embodiments.

FIG. 3 illustrates example operations of a method 300 for dynamically generating virtual avatars with optimized video data transmission of one or more disclosed embodiments, starting at block 302. In a disclosed embodiment, for example VR Controller 202 and Virtual Avatar Control Code 182 (e.g., software code) of the VR system 200 implement operations of method 300. As shown at block 304, VR controller 202 identifies current computing power capabilities of the endpoint users for the video conference. As shown at block 306, before starting or at the beginning of a video conference for each endpoint user or attendee of the video conference, the VR system 200 renders (e.g., detects and builds) a digital twin of a virtual avatar. During the video conference, the VR system 200 uses the respective digital twin of the virtual avatars to render the user's face with identified characteristics and body movement points from a digital perspective to dynamically establish the digital twin virtual avatar. At block 308, during the video conference or video call, the VR system 200 detects and digitizes cardinal points of specific expressions and body movements identifying specific points of interests to be gathered and transmitted. For example, the VR system 200 transmits the cardinal points to each video conference participant for use to transform those specific face points to the digital face that represent gestures or heads behaviors such as: smile, angry, surprise, head rotate, depth, among others. The cardinal point information transferred during the video conference is based upon the points computed from the attendees and transformed to actions and gestures to digital faces.

For example, to determine an optimal amount of cardinal points to be processed, the VR system 200 can select a minimum per feature points based on current low available bandwidth or data stream capability. The VR system 200 similarly can select a minimum number of cardinal points to be processed for basic expressions and movement based on minimum available graphics processing power to build a 2D map to a 3D model for face rebuilding complexity. When the available bandwidth or data stream capability exceeds a set threshold bandwidth and the available graphics processing power exceeds a set threshold value to build 3D models, the VR system 200 can select a maximum number of cardinal points to render the micro and basic expressions with the most detailed movement.

At block 310, the VR system 200 computes an optimal vector for video data transmission a given time. At block 312, the VR system 200 computes or determines cardinal points representing expressions and body movements to be processed for rendering the digital twin of the user virtual avatar in accordance with disclosed embodiments. Based on a disclosed reconstruction method, the minimum number of required cardinal points to track on the user's face varies as function to the available bandwidth and receiving end of the user's data.

For example, VR system 200 translates the image captured by the end user camera or sensors, for example into a 2-dimensional array containing cardinal points of horizontal and vertical positions. For example, an array of cardinal points P1-PN includes an array [X, Y]. For an example array of 1920 by 1080 pixels of resolution, the cardinal points P1-PN can be represented by pixel position for example, with a respective horizontal X position and vertical Y position, relative to an origin pixel position. In the example 1920 by 1080 pixel array, at the Ref 0 or origin, X and Y=0 or Ref 0 [0, 0] and a maximum limit point or Ref M, such as Ref M [1920, 1080], which represents a maximum resolution of the camera or sensor. Multiple example cardinal points are illustrated in virtual avatar illustrations of FIGS. 5, 6, and 7.

Figure 5:
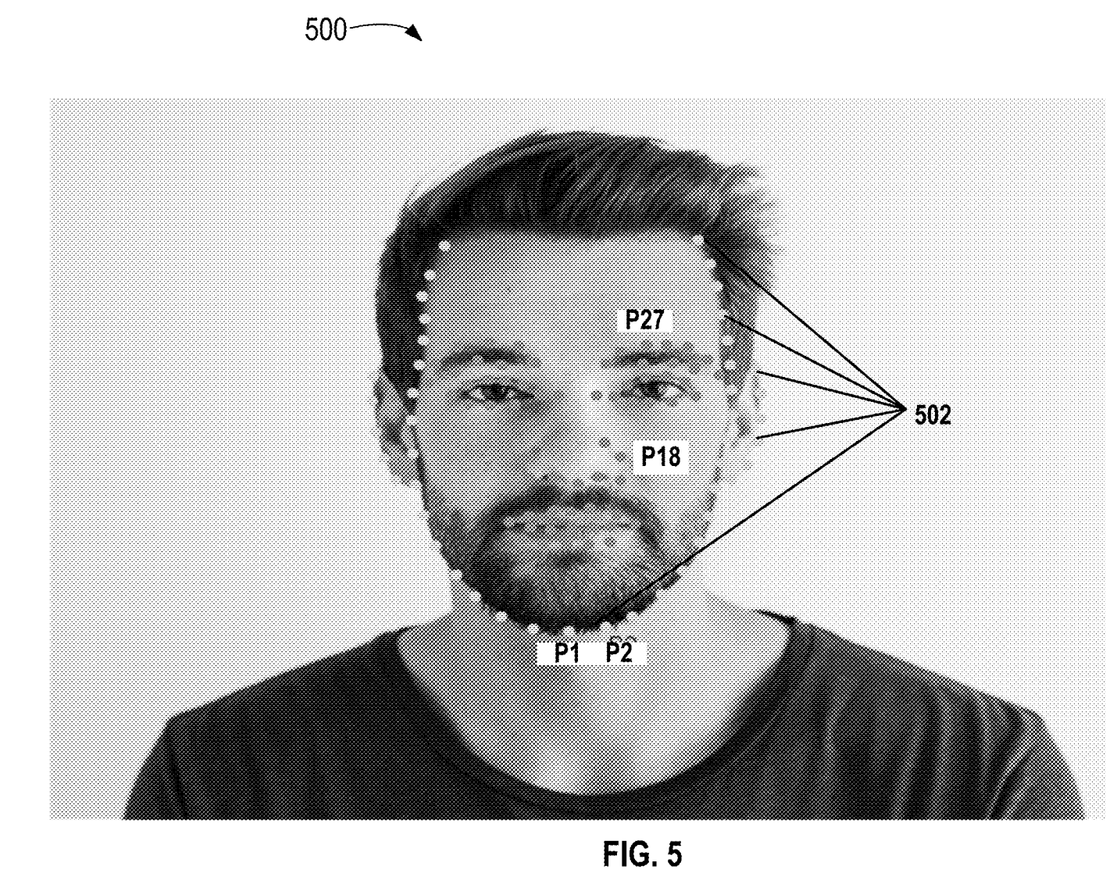
FIGS. 5, 6, and 7 illustrate example virtual avatar models with example physiognomic and body points of the user of one or more disclosed embodiments.
Figure 6:
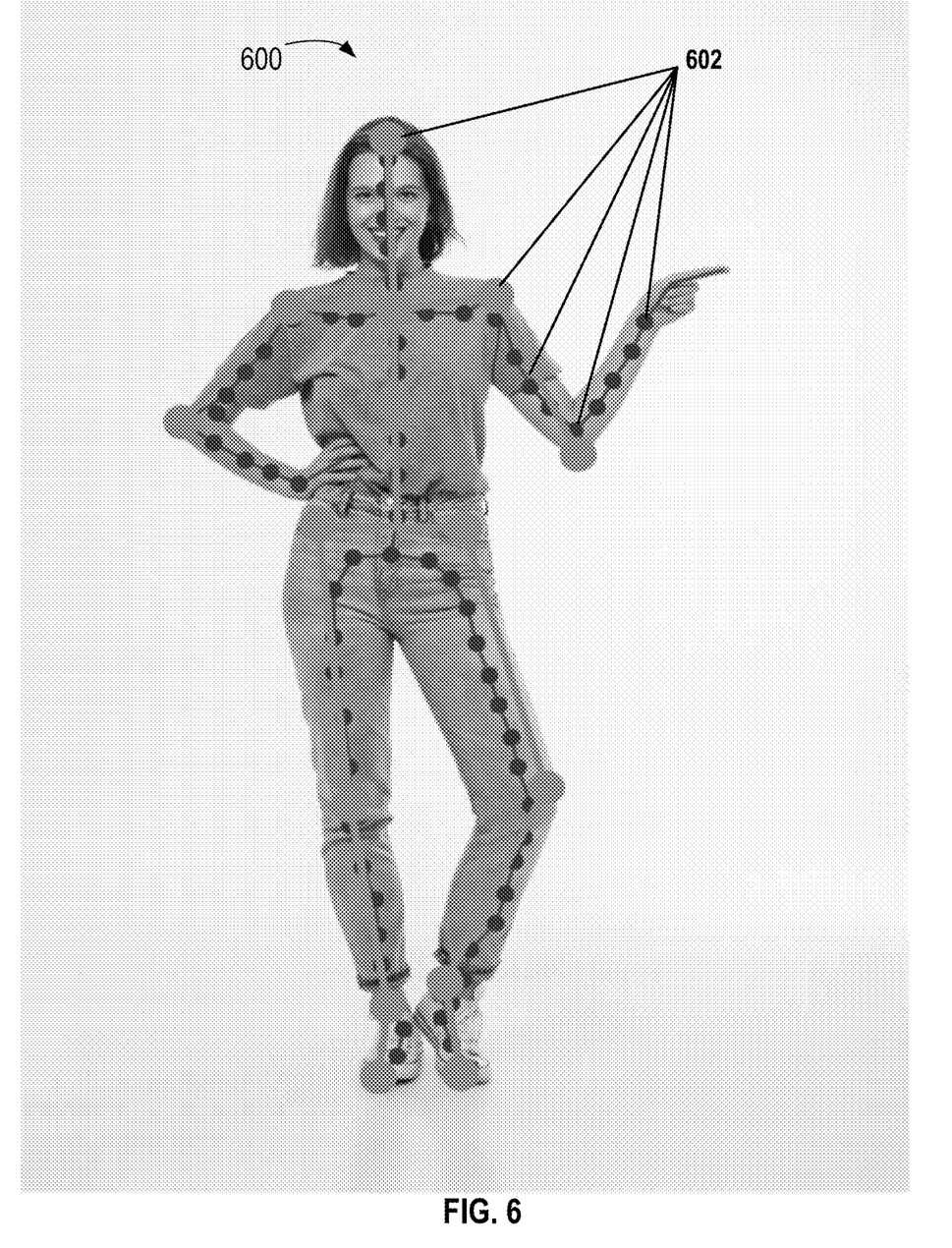
Figure 7:
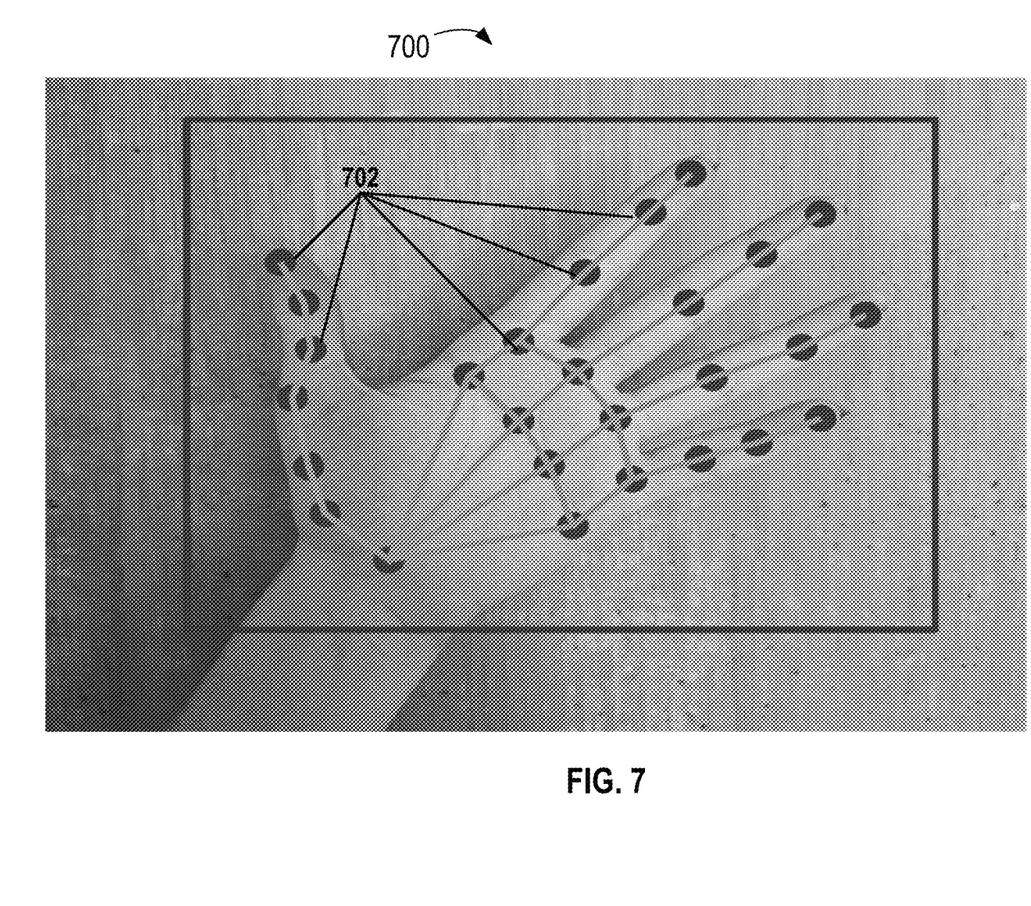

Referring also to FIGS. 5, 6, and 7, example virtual avatar models 500, 600, and 700 are illustrated, each including a plurality of example respective cardinal points 502, 602, and 702 representing physiognomic points and/or body points of the user of one or more disclosed embodiments. For example, as shown in FIG. 5, the virtual avatar model 500 includes the cardinal points 502 representing physiognomic facial points including cardinal points labeled P1, P2 near a chin, P18 near a nose, and P27 near an eyebrow of the virtual face image of the virtual avatar model 500. For example, as shown in FIG. 6, the virtual avatar model 600 includes the cardinal points 602 representing multiple of body action points of the virtual body image of the virtual avatar model 600. For example, cardinal points 602 represent multiple selected body joints used to create, for instance, a specific rotation of the user or conference attendee in a reconstructed virtual avatar using such cardinal points 602. Further example cardinal points 702 are shown in the virtual avatar model 700 of FIG. 7, which represent multiple of body action points of the illustrated virtual hand image of the virtual avatar model 700. In the illustrated virtual avatar models 500, 600, and 700, VR system 200 processes a captured image to detect and digitize cardinal points, such as cardinal points 502, 602, 702 of specific expressions and body movements identifying specific points of interests to be transmitted to other attendees of the video conference.

Referring again to FIG. 3, at block 314, the VR system 200 starts a vectorized data transmission of the determined cardinal points representing expressions and body movements to be used for rendering the digital twin of the user virtual avatar in accordance with disclosed embodiments. For example, in a disclosed embodiment, the cardinal points are sent with a frequency of at least 24-30 vectors per second (as a normal video), depending on the available bandwidth, with the set maximum number of cardinal points. The VR system 200 determines the total number of cardinal points for the receiving end user based on the graphical processing power available. For example, in a disclosed embodiment, the number of points generally determines a possible level of refinement of the re-built 3D model of the virtual avatar processed by the receiving device. At block 316, the VR system 200 sends the data stream to the digital twin on the immersive environment to be rendered, where each receiving endpoint rebuilds the digital twin model of the virtual avatar based on the received data stream with movement adjusted based on cardinal points. Operations end at block 318.

Figure 4:
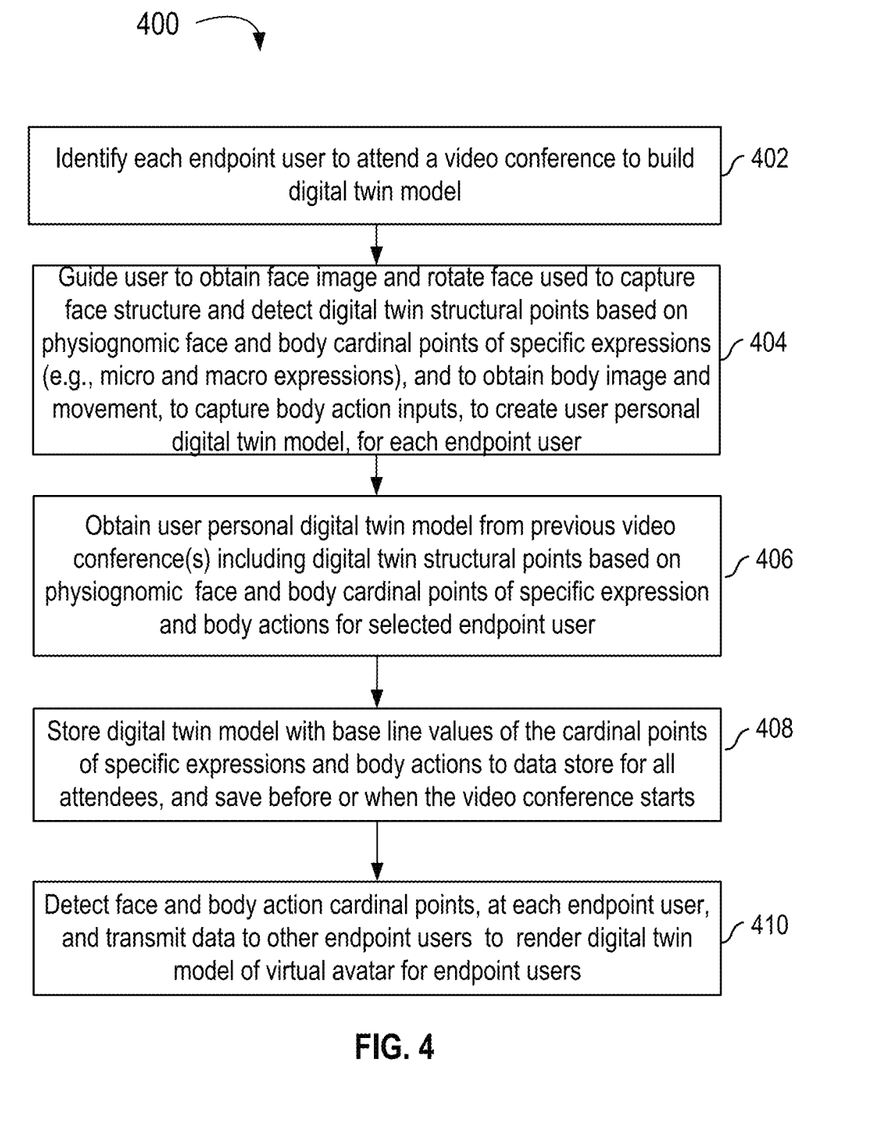
FIG. 4 is a flow chart illustrating example operations of a method for creating a digital twin model with physiognomic face and body cardinal points of a virtual avatar of one or more disclosed embodiments.

FIG. 4 illustrates example operations of a method 400 for creating a digital twin model with physiognomic face and body cardinal points of a virtual avatar of one or more disclosed embodiments. Method 400 illustrates further details of operations of method 300 of FIG. 3 of each endpoint user in a video conference for building the digital twin and rendering virtual avatars. At block 402, VR system 200 identifies each endpoint user to attend a video conference to build a digital twin model of a virtual avatar. In a disclosed embodiment, VR system 200 builds a digital twin model using a camera or optical sensors, such as infrared sensors or depth sensors, of an endpoint user device. During the video conference, the VR system 200 enables an endpoint user device to detect and transmit key cardinal points, for example of the endpoint user speaker, which a receiver endpoint user device uses to re-build the digital twin model image of the virtual avatar of the speaker.

At block 404, the VR system 200 prompts the user to setup and digitalize a face image, and depending on the hardware capabilities of the user, more or less cardinal points may be translated to facial expressions or digital twin body actions on the endpoint. For example, the VR system 200 provides prompts to guide the user to obtain the user' face image and to rotate the user face image to capture the face structure image at block 404. At block 406, in a case where the user ignores the set-up prompts, the VR system 200 can create a personal digital twin from a historical video conference of the user or multiple previous video conferences. The VR system 200 can create the personal digital twin to include as baseline detected physiognomic face and body cardinal points for example representing, a smile, blink, cry, angry face, or body such as stand-up, sit-down, hands gestures and the like.

At block 408, the VR system 200 saves the digital twin model with the cardinal points, for example the digital twin model is saved in the data store 204 of system 200, which can be used (e.g., by VR controller 202 and the endpoint user devices) to correlate the cardinal points with future face expressions during video conferences. At block 410, the VR system 200 detects face and body action cardinal points, at each endpoint user, and transmits the cardinal point data to other endpoint users. The other endpoint users receive and use the cardinal point data to render the digital twin model of the virtual avatar for the endpoint user.

Figure 8:
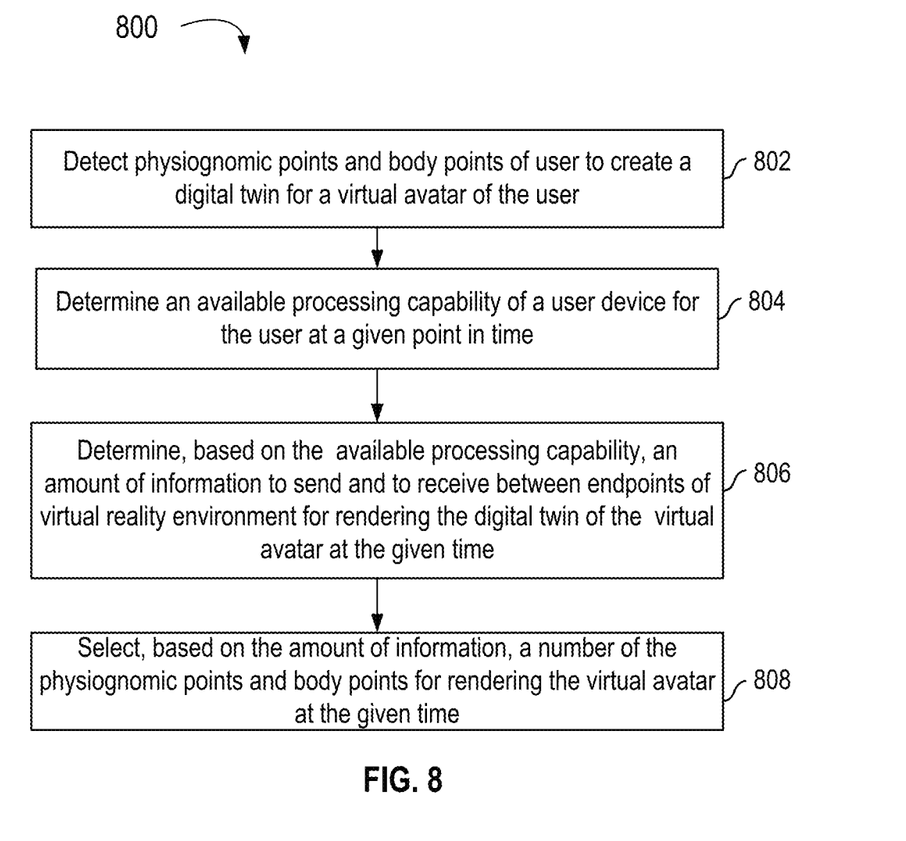
FIG. 8 is a flow chart illustrating a method for dynamically generating virtual avatars to optimize video data transmission of one or more disclosed embodiments.

FIG. 8 illustrates a method 800 for dynamically generating virtual avatars to optimize video data transmission (e.g., implemented by the VR system 200) of one or more disclosed embodiments. Method 800 includes example operations and features as described with respect to method 300 and method 400. At block 802, the VR system 200 detects physiognomic points and body points of a user in order to create a digital twin for a virtual avatar of the user. At block 804, VR system 200 determines an available processing capacity at a given time based on the detecting the physiognomic points and body points of the user. For example, the VR system 200 detects available network bandwidth (e.g., network upload and download speeds) and available computing power of a user device of the user with detecting the physiognomic points and body points of the user. At block 806, VR system 200 determines, based on the available processing capacity, an amount of information to send and receive between endpoints of a virtual reality system for rendering the digital twin of the user's virtual avatar at the given time.

For example, the VR system 200 can compute a network factor nf which, is proportional to the upload speed us_i and download speed ds_i and inversely proportional to a constant factor ci which is an expected experience network power based on the immersive experience. The example network factor nf can be represented by the following equation:

$$nf = \sum_{i=0}^{n} \frac{us_i ds_i}{c_i}$$

For example, the VR system 200 can compute a performance factor pf, which is directly proportional to the computer units cu_i available in the endpoint and inversely proportional to the computer power needed by immersive experience to run. The example performance factor pf can be represented by the following equation:

$$pf = \sum_{i=0}^{n} \frac{cu_i}{c_i}$$

At block 808, VR system 200 selects a number of the physiognomic points and body points for rendering a virtual avatar at the given time based on the determining the amount of information.

For example, the VR system 200 can use the calculated network factor nf and the performance factor pf to select the number of cardinal points represented by an expression factor ef based on the network and performance factors, to provide a smooth immersive metaverse experience based on reachable micro or macro expressions which is correlated to the selected number of cardinal points ex_i at a given time. The example expression factor ef can be represented by the following equation:

$$ef = \sum_{i=0}^{n} \frac{nf_i \cdot pf_i}{ex_i}$$

For example, based on computed expression factors the VR system 200 can select cardinal points corresponding, or correlated to specific expressions represented by physiognomic points and body points of the user from micro to macro physiognomic expressions, for example as shown in the following Table 1:

TABLE 1

| Expression | Cardinal points required (expression factor) |
| --- | --- |
| Blink | 125 |
| Talk | 250 |
| Smile | 380 |
| Laugh | 500 |
| Cry | 900 |
| Hand motion | 1200 |
| Shoulders and arms tracking | 3500 |

While the foregoing is directed to embodiments of the present invention, other and further embodiments of the invention may be devised without departing from the basic scope thereof, and the scope thereof is determined by the claims that follow.

What is claimed is:

1. A method comprising:
   detecting physiognomic points and body points of a user in order to create a digital twin for a virtual avatar of the user;
   identifying, based on the physiognomic points and body points, a maximum available resolution at a given time;
   determining, based on the maximum available resolution and the physiognomic points and body points, an available processing capacity for a user device of the user at the given time;
   determining, based on the available processing capacity, an amount of information to send and receive between user endpoints of a virtual reality system for rendering the digital twin of the user's virtual avatar at the given time; and
   selecting, based on the amount of information, a number of the physiognomic points and body points to use to render the virtual avatar at the given time.

2. The method of claim 1, further comprising obtaining a stored digital twin for the virtual avatar of the user.

3. The method of claim 2, wherein obtaining the stored digital twin further comprises at least one of prompting the user to capture a face image and rotate the face to capture a face structure image to create the digital twin; or obtaining the digital twin from a historical video conference of the user.

4. The method of claim 1, wherein the physiognomic points and body points represent one or more of a smile, a blink, a cry, a stand-up, sit-down, or a hand gesture of the user.

5. The method of claim 1, wherein detecting the physiognomic points and body points of the user further comprises detecting the physiognomic points and body points based on one or more specific expressions and body actions of a plurality of physiognomic expressions and body actions of a stored digital twin for the virtual avatar of each user.

6. The method of claim 1, wherein detecting the physiognomic points and body points of the user further comprises detecting the physiognomic points and body points of each user in a video conference to be transmitted to other users of the video conference to generate a respective digital twin for the respective virtual avatar of each user.

7. The method of claim 1, wherein detecting the physiognomic points and body points of the user further comprises translating the physiognomic points and body points into an array containing cardinal points representing the physiognomic points and body points of the user, each cardinal point represented by a horizontal and vertical position.

8. The method of claim 1, wherein selecting, based on the amount of information, the number of the physiognomic points and body points for rendering the virtual avatar at the given time further comprises selecting cardinal points representing the physiognomic points and body points of the user based on one or more specific expressions and body actions of the user.

9. The method of claim 1, wherein selecting, based on the amount of information, the number of the physiognomic points and body points for rendering the virtual avatar at the given time further comprises selecting cardinal points corresponding to specific face expressions from the detected physiognomic points and body points of the user during the video conference.

10. The method of claim 1, wherein determining, based on the maximum available resolution and the physiognomic points and body points, the available processing capacity for the user at the given time further comprises detecting an available network bandwidth and an available computing power of a user device.

11. A system, comprising:
    a processor; and
    a memory, wherein the memory includes a computer program product configured to perform operations for generating virtual avatars, the operations comprising:
    detecting physiognomic points and body points of a user in order to create a digital twin for a virtual avatar of the user;
    identifying, based on the physiognomic points and body points, a maximum available resolution at a given time;
    determining, based on the maximum available resolution and the physiognomic points and body points, an available processing capacity for a user device of the user at the given time;
    determining, based on the available processing capacity, an amount of information to send and receive between user endpoints of a virtual reality system for rendering the digital twin of the user's virtual avatar at the given time; and
    selecting, based on the amount of information, a number of the physiognomic points and body points to use to render the virtual avatar at the given time.

12. The system of claim 11, further comprising obtaining a stored digital twin for the virtual avatar of the user.

13. The system of claim 12, wherein obtaining the stored digital twin further comprises at least one of prompting the user to capture a face image and rotate the face to capture a face structure image to create the digital twin; or obtaining the digital twin from a historical video conference of the user.

14. The system of claim 11, wherein detecting the physiognomic points and body points of the user further comprises translating the physiognomic points and body points into an array containing cardinal points representing the physiognomic points and body points of the user, each cardinal point represented by a horizontal and vertical position.

15. The system of claim 11, wherein selecting, based on the determining the amount of information, the number of the physiognomic points and body points for rendering the virtual avatar at the given time further comprises selecting cardinal points representing the physiognomic points and body points of the user based on one or more specific expressions and body actions of the user.

16. A computer program product for generating virtual avatars, the computer program product comprising:
   detecting physiognomic points and body points of a user in order to create a digital twin for a virtual avatar of the user;
   identifying, based on the physiognomic points and body points, a maximum available resolution at a given time;
   determining, based on the maximum available resolution and the physiognomic points and body points, an available processing capacity for a user device of the user at the given time;
   determining, based on the available processing capacity, an amount of information to send and receive between user endpoints of a virtual reality system for rendering the digital twin of the user's virtual avatar at the given time; and
   selecting, based on the amount of information, a number of the physiognomic points and body points to use to render the virtual avatar at the given time.

17. The computer program product of claim 16, further comprising obtaining a stored digital twin for the virtual avatar of the user.

18. The computer program product of claim 17, wherein obtaining the stored digital twin further comprises at least one of prompting the user to capture a face image and rotate the face to capture a face structure image to create the digital twin; or obtaining the digital twin from a historical video conference of the user.

19. The computer program product of claim 16, wherein detecting the physiognomic points and body points of the user further comprises translating the physiognomic points and body points into an array containing cardinal points representing the physiognomic points and body points of the user, each cardinal point represented by a horizontal and vertical position.

20. The computer program product of claim 16, wherein selecting, based on the determining the amount of information, the number of the physiognomic points and body points for rendering the virtual avatar at the given time further comprises selecting cardinal points representing the physiognomic points and body points of the user based on one or more specific expressions and body actions of the user.

* * * * *